United States Patent
Mathiske et al.

(10) Patent No.: US 7,904,904 B2
(45) Date of Patent: Mar. 8, 2011

(54) PROCESSING EVENTS FOR CONCURRENT TASKS IN A VIRTUAL MACHINE

(75) Inventors: Bernd J. Mathiske, Cupertino, CA (US); Kinsley Wong, San Francisco, CA (US); Hideya Kawahara, Mountain View, CA (US); Nedim Fresko, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 1158 days.

(21) Appl. No.: 10/782,242

(22) Filed: Feb. 18, 2004

(65) Prior Publication Data

US 2005/0183083 A1    Aug. 18, 2005

(51) Int. Cl.
*G06F 9/455* (2006.01)
*G06F 9/46* (2006.01)

(52) U.S. Cl. ............................................. 718/100; 718/1

(58) Field of Classification Search .................. 718/100, 718/1

See application file for complete search history.

(56) References Cited

U.S. PATENT DOCUMENTS

| | | | | |
|---|---|---|---|---|
| 6,173,332 B1* | 1/2001 | Hickman | ................... | 709/235 |
| 6,199,099 B1* | 3/2001 | Gershman et al. | ............ | 709/203 |
| 6,370,590 B1* | 4/2002 | Nitz et al. | ................. | 719/317 |
| 6,711,620 B1* | 3/2004 | Yoshii et al. | ................. | 709/229 |
| 7,171,663 B2* | 1/2007 | Moore et al. | ..................... | 718/1 |
| 7,325,233 B2* | 1/2008 | Kuck et al. | ................... | 718/103 |

FOREIGN PATENT DOCUMENTS

| | | |
|---|---|---|
| EP | 0 953 906 A | 11/1999 |
| JP | 5289836 A | 11/1993 |

OTHER PUBLICATIONS

Sun Microsystems, Inc., "Mobile Information Device Profile (JSR-37) JCP Specification, Java 2 Platform, Micro Edition, 1.0a", Dec. 15, 2000, Copyright © 1999-2000 Sun Microsystems, Inc., Palo Alto, California, Chapters 1-9, pp. i-284.
Sun Microsystems, Inc.; PCT/US2005/004212 filed Feb. 9, 2005; International Search Report as published; Apr. 9, 2008; ISA/EP; 4pp.
Schlapfer et al.; "Mobile Applications With J2ME A White Paper"; White Paper Ericsson, Jul. 7, 2001, 26pp.

(Continued)

*Primary Examiner* — Li B Zhen
*Assistant Examiner* — Mengyao Zhe
(74) *Attorney, Agent, or Firm* — Marsh Fischmann & Breyfogle LLP (57) ABSTRACT

Techniques for processing native events associated with tasks that are concurrently supported in a virtual machine are disclosed. The techniques allow the user of a virtual machine to concurrently perform tasks even if these tasks require processing of platform-specific (or native) events (e.g., platform-specific input). A smart event-dispatcher is used to dispatch native events to multiple tasks that are concurrently supported by the virtual machine. The smart event-dispatcher can determine which one of a plurality of concurrent tasks should receive the native event for processing. The determination can be made based on a variety of different criteria. In mobile devices, the foreground task is typically the only task that is displayed for the user of mobile devices at any given time. Thus, dispatching events to the foreground task is especially useful for a virtual machine that support a mobile device.

13 Claims, 5 Drawing Sheets

OTHER PUBLICATIONS

JSR 118 Expert Group; "Mobile Information Device Profile, Version 2.0, JSR 118"; Nov. 5, 2002, Sun Microsystems, retrieved from the Internet: URL: http://jcp.org/aboutJava/communityprocess/final/jsr118/index.html; 566pp.

Balfanz D. et al.; "Experience With Secure Multi-Processing In Java"; Princeton University; Sep. 29, 1997; retrieved from the internet: URL: http://www.cs.princeton.edu/sip/pub/icdcs.pdf; 12pp.

* cited by examiner

PROCESSING EVENTS FOR CONCURRENT TASKS IN A VIRTUAL MACHINE

BACKGROUND

The present invention relates generally to computing systems, and more particularly, to techniques for processing events for concurrent tasks in a virtual machine.

One of the goals of high-level computer programming languages is to provide a portable programming environment. In such an environment, computer programs may easily be ported to another computer platform. High-level languages such as "C" provide a level of abstraction from the underlying computer architecture and their success is well evidenced from the fact that most computer applications are now written in a high level language.

Portability has been taken to new heights with the advent of the World Wide Web ("the Web") as an interface protocol for the Internet. The World Wide Web allows communication between diverse computer platforms through a graphical interface. Computers communicating over the Web are able to download and execute small applications called applets. Given that applets may be executed on a diverse assortment of computer platforms, the applets are typically executed by a Java™ virtual machine. In general, a virtual machine is an abstract computing machine that is implemented over specific hardware and/or software. The virtual machine can support platform applications for the specific hardware and/or software. Given that the Java™ virtual machine is more prevalent, the Java computing environment will be discussed further.

Recently, the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation. The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java Virtual Machine Specification, Second Edition*, by Tim Lindholm and Frank Yellin, ISBN 0-201-43294-3, April 1999, which is hereby incorporated herein by reference.

Figure 1A:
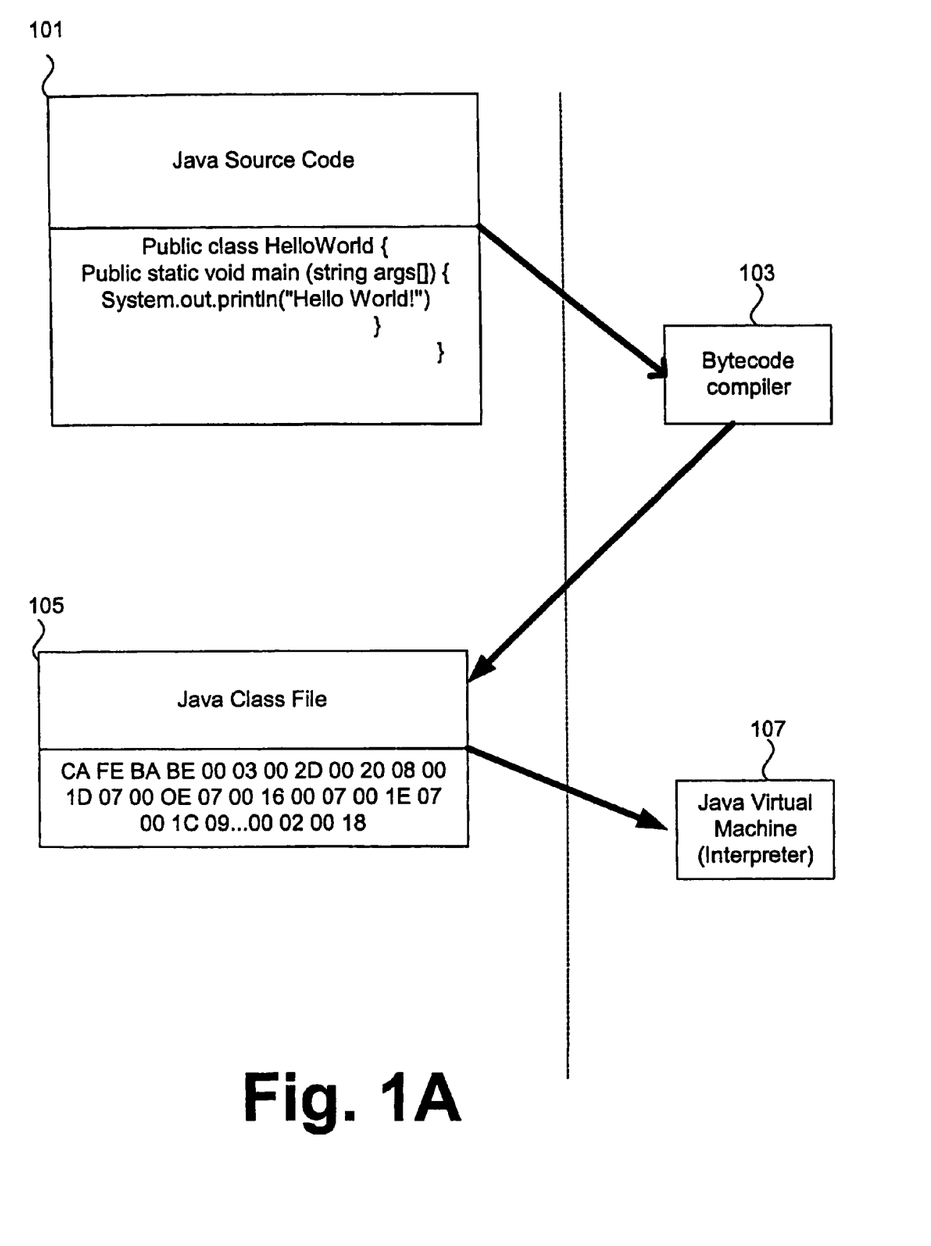
FIG. 1A shows a progression of a simple piece of a Java source code through execution by an interpreter, the Java virtual machine.

FIG. 1A shows a progression of a simple piece of a Java source code 101 through execution by an interpreter, the Java virtual machine. The Java source code 101 includes the classic Hello World program written in Java. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler outputs a Java class file 105 that includes the Bytecodes for the Java program. The Java class file is input into a Java virtual machine 107. The Java virtual machine is an interpreter that decodes and executes the Bytecodes in the Java class file. The Java virtual machine is an interpreter, but is commonly referred to as a virtual machine as it emulates a microprocessor or computer architecture in software (e.g., the microprocessor or computer architecture may not exist in hardware).

Virtual machines are highly useful. However, as will be discussed below, conventional virtual machines do not provide a multi-tasking environment in a manner that would allow a user to concurrently perform some tasks. These tasks, for example, include interactive tasks (e.g., application programs) that receive input from the user or another source.

In a multi-tasking computing environment, a task can be referred to as a single computing unit that typically performs a task. The computing unit can, for example, be represented by a set of programming instructions (e.g., high-level programming instruction written in C, C++, or Java). On the other hand, a task may also be an entire application program (or applet). By way of example, a task may be a calculator, a music player, a video player, or an interactive game. The user can initiate and use each of these tasks to form a function or computing task.

In any case, a computing system that supports multi-tasking allows tasks to run concurrently. Concurrent tasks typically take turns to execute and/or share the resources of the computer system. However, from the user's perspective multiple tasks can be performed concurrently. By way of example, a user can use a calculator application and a music player concurrently. This allows the user to do calculations while listening to the music. Conventional virtual machines, however, do not provide a multi-tasking environment in a manner that would allow a user to concurrently use tasks that are interactive. This means that the user of a conventional virtual machine cannot effectively interact with two concurrent tasks.

In view of the foregoing, techniques for multi-tasking in a virtual machine are needed.

SUMMARY

As noted above, virtual machines are highly useful in today's computing environments. Furthermore, it is desirable to develop virtual machines that support multi-tasking because such an environment would also allow users to perform multiple tasks concurrently.

In a multi-tasking computing environment, a task can be referred to as a unit of computing that typically performs a task. The computing unit can, for example, be represented by a set of programming instructions (e.g., high-level programming instruction written in C, C++, or Java). A task may also be or can be associated with an entire application program, or applet. By way of example, a task may be a calculator, a music player, a video player, a computer game. In any case, a computing environment that supports multi-tasking allows tasks to run concurrently. These multiple tasks can take turn to execute and/or share the resources of a computer system. This allows a user to perform multiple tasks. By way of example, a user can use a calculator application and a music player concurrently. This allows the user to do calculations while listening to the music.

Some tasks, however, require "event" processing. These tasks, for example, include interactive programs that receive input from users, and as such are typically more interesting to the users. Event processing includes delivering and handling external events (e.g., input received from the user from a keyboard) to the appropriate task (e.g. an interactive game). In virtual machines, external events are typically generated, transmitted, or processed by platform specific hardware or software components. These platform-specific events can be referred to as "native" events. Processing native events in a virtual machine introduces new problems that are not typically addressed in more conventional computing environments where application programs are platform-dependent. As such, processing native events in a virtual machine need to be addressed.

Conventional virtual machines, however, do not provide a mechanism for processing native events for concurrent tasks in a multi-tasking environment. This means that the user of a conventional virtual machine cannot concurrently use two tasks if both of these tasks require native event processing. Accordingly, techniques for processing native events in a virtual machine that supports multi-tasking are needed. Processing native events is not a problem that is typically encountered in more conventional computing environments where application programs are platform-dependent. Hence, these techniques should address problems that are not typically encountered in more conventional computing environments.

Broadly speaking, the invention relates to techniques for processing native events associated with multiple tasks that are concurrently supported in a virtual machine. The techniques allow the user of a virtual machine to concurrently perform tasks even if these tasks require processing of platform-specific (or native) events (e.g., platform-specific input). In accordance with one aspect of the invention, a virtual machine that uses a smart event-dispatcher to dispatch native events is disclosed. The smart event-dispatcher delivers native events to multiple tasks that are concurrently supported by the virtual machine. As will be appreciated, the smart event-dispatcher can determine which one of a plurality of concurrent tasks should receive the native event for processing. The determination can be made based on a variety of different criteria. By way of example, native events generated, processed, or transmitted by a particular platform-dependent entity (e.g., a device) can be assigned to a particular task. Events can also be dispatched based on user assignment (e.g., be programmed by the user), or dispatched based on various attributes of the event (e.g., content, incoming port, proximity, etc.) In one embodiment, native events are delivered to a foreground task. In mobile devices, the foreground task is typically the only task displayed for the user at a given time. Thus, this embodiment is especially useful for virtual machines that support a mobile device.

The invention can be implemented in numerous ways, including as a method, an apparatus, a computer readable medium, and a database system. Several embodiments of the invention are discussed below.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As noted in the background section, virtual machines are highly useful in today's computing environments. Furthermore, it is desirable to develop virtual machines that support multi-tasking because such environment would also allow users to perform multiple tasks concurrently.

In a multi-tasking computing environment, a task can be referred to a unit of computing that typically performs a task. The computing unit can, for example, be represented by a set of programming instructions (e.g., high-level programming instruction written in C, C++, or Java). A task may also be or can be associated with an entire application program or applet. By way of example, a task may be a calculator, a music player, a video player, or a computer game. In any case, a computing environment that supports multi-tasking allows tasks to run concurrently. These multiple tasks can take turn to execute and/or share the resources of a computer system. This allows a user to perform multiple tasks. By way of example, a user can use a calculator application and a music player concurrently. This allows the user to do calculations while listening to the music.

Processing some tasks, however, require "event" processing. These tasks, for example, include interactive programs that receive input from users, and as such are typically more interesting to the users. Event processing includes delivering and handling external events (e.g., input received from the user from a keyboard) to the appropriate task (e.g. an interactive game). In virtual machines, external events are typically generated, transmitted, or processed by platform specific hardware or software components. These platform-specific events can be referred to as "native" events. Processing native events in a virtual machine introduces new problems that are not typically addressed in more conventional computing environments where application programs are platform-dependent. As such, processing native events in a virtual machine need to be addressed.

Conventional virtual machines, however, do not provide a mechanism for processing native events for concurrent tasks in a multi-tasking environment. This means that the user of a conventional virtual machine cannot concurrently use two tasks if both of these tasks require native event processing. Accordingly, techniques for processing native events in a virtual machine that supports multi-tasking are needed. Processing native events is not a problem that is typically encountered in more conventional computing environments where application programs are platform-dependent. Hence, these techniques should address problems that are not typically encountered in more conventional computing environments.

Accordingly, the invention pertains to techniques for processing native events associated with multiple tasks that are concurrently supported in a virtual machine. The techniques allow the user of a virtual machine to concurrently perform tasks even if these tasks require processing of platform-specific (or native) events (e.g., platform-specific input). In accordance with one aspect of the invention, a virtual machine that uses a smart event-dispatcher to dispatch native events is disclosed. The smart event-dispatcher delivers native events to multiple tasks that are concurrently supported by the virtual machine. As will be appreciated, the smart event-dispatcher can determine which one of a plurality of concurrent tasks should receive the native event for processing. The determination can be made based on a variety of different criteria. By way of example, native events generated, processed, or transmitted by a particular platform-dependent entity (e.g., a device) can be assigned to a particular task. Events can also be dispatched based on user assignment (e.g., be programmed by the user), or dispatched based on various attributes of the event (e.g., content, incoming port, proximity, etc.) In one embodiment, native events are delivered to a foreground task. In mobile devices, the foreground task is typically the only task displayed for the user at a given time. Thus, this embodiment is especially useful for virtual machines that support a mobile device.

Embodiments of the invention are discussed below with reference to FIGS. 1B-3. However, those skilled in the art will readily appreciate that the detailed description given herein with respect to these figures is for explanatory purposes only as the invention extends beyond these limited embodiments.

Figure 1B:
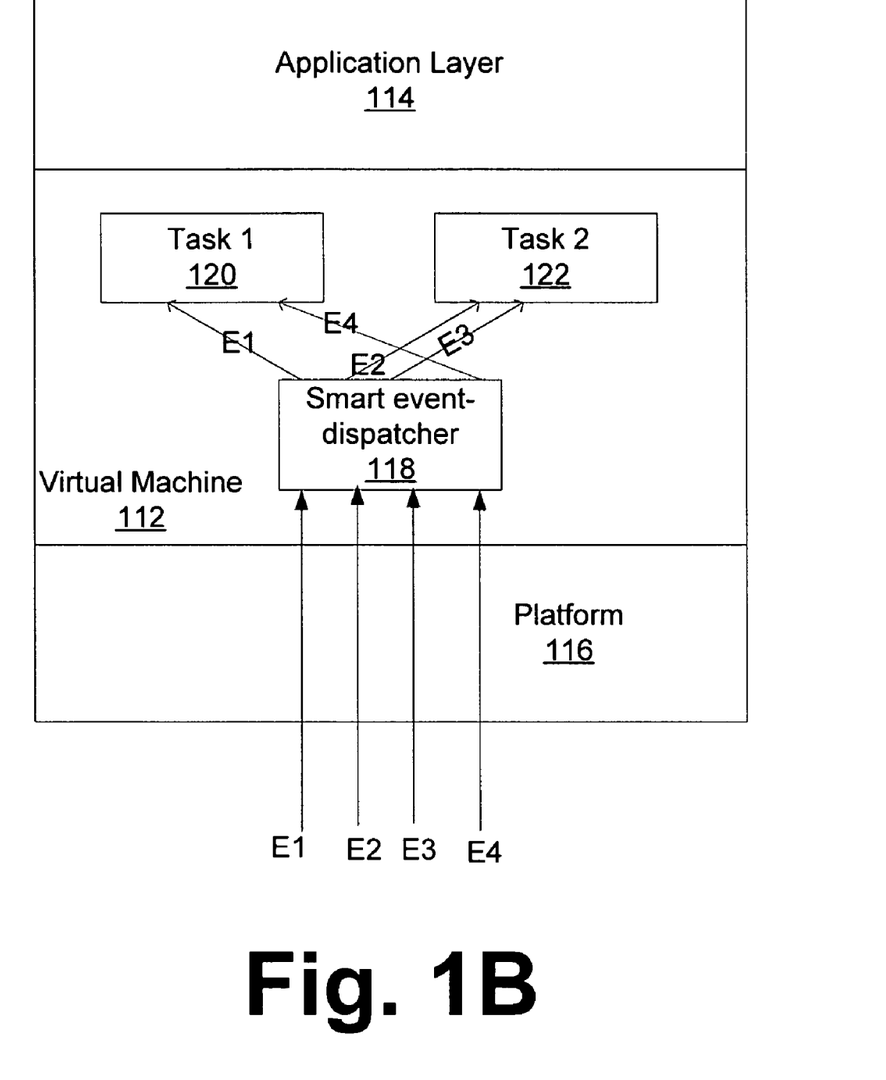
FIG. 1B illustrates a computing environment in accordance with one embodiment of the invention.

FIG. 1B illustrates a computing environment 110 in accordance with one embodiment of the invention. As shown in FIG. 1B, a virtual machine 112 supports an application layer 114 over a platform 116. The application layer 114 represents one or more applications (e.g., applets) that are supported by the virtual machine 112. The platform 116 represents hardware and/or software specific components of the computing environment 110. It should be noted that the one or more applications in the application layer 114 that are supported by the virtual machine 112, can be platform-independent. In other words, an application in the application layer 114 may be ported to a different platform (not shown). It should also be noted that the virtual machine 112 supports two concurrent tasks, namely task 120 and task 122 that are operating concurrently on virtual machine 112.

As illustrated in FIG. 1B, the virtual machine 112 receives several platform specific events (or native events) E1, E2, E3 and E4 that are associated with tasks 120 and 122. These native events can, for example, be incoming data received via a network device (or Interface), input generated by a user via a keyboard, and so on. In general, a native event can be any event that is a generated, processed, or transmitted by the platform 116. In any case, these native events are to be presented to appropriate task for processing by the virtual machine 112.

As will be appreciated, a smart event dispatcher 118 determines which one of the concurrent tasks 120 and 122 should receive the native events E1, E2, E3 and E4. By way of example, events E1 and E4 are delivered to a task 120. On the other hand, native events E2 and E3 are delivered to task 122. These native events may be received by the smart-event dispatcher 118 directly for dispatching, however, this is not a requirement.

The determination made by the smart event-dispatcher 118 can be made based on a variety of desired criteria. By way of example, native events generated or received from a particular entity (e.g., device) can be assigned to a particular task. In another embodiment, native events are dispatched to the task that is currently in the foreground (e.g., currently being displayed for the user). The native event dispatcher 118 can also, for example, dispatch events based on user selection (e.g., be programmed by the user), or dispatch events based on event attributes (e.g., content, incoming, port, proximity, etc.) In any case, the smart event-dispatcher 118 delivers a native event to a particular task in the multi-tasking environments supported by the virtual machine 112.

Figure 1C:
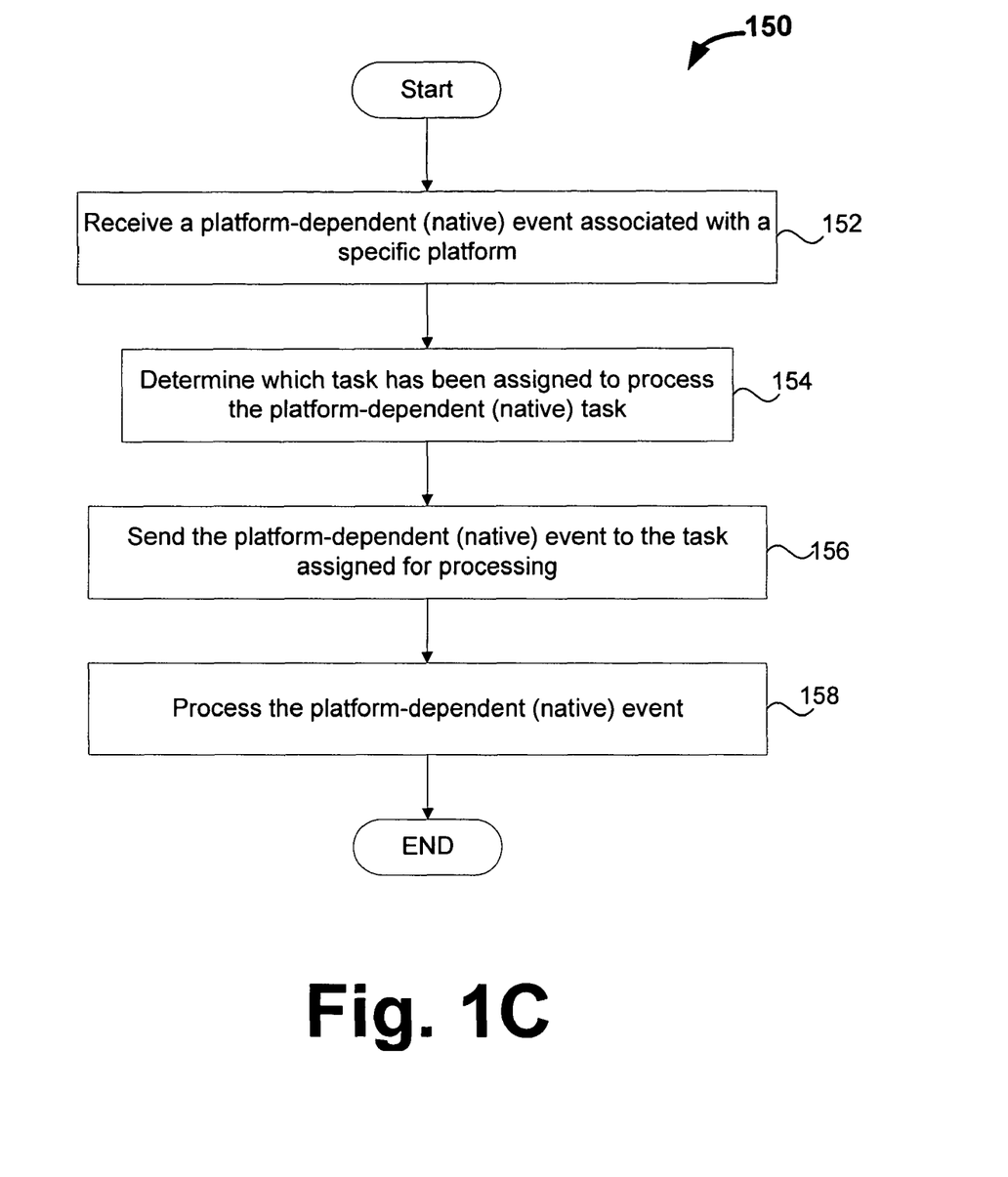
FIG. 1C illustrates a method for processing, a platform-dependent (native) event associated with a specific platform, in a virtual machine that supports concurrent tasks in accordance with one embodiment of the invention.

FIG. 1C illustrates a method 150 for processing a platform-dependent (native) event associated with a specific platform in a virtual machine that supports concurrent tasks in accordance with one embodiment of the invention. The method 150 can, for example, be used by the virtual machine 112 to process native events associated with the platform 116 (shown in FIG. 1B). Initially, at operation 152, a platform-dependent (native) event associated with a specific platform is received. Next, at operation 154, it is determined which task that has been assigned to process the platform-dependent (native) event. Thereafter, the method 150 proceeds to operation 156 where the platform-dependent (native) event is sent to the task assigned to process the platform-dependent (native) event. Accordingly, at operation 158, the platform-dependent (native) event is processed by the task that has been assigned to process it. The method 150 ends following operation 158.

Figure 2:
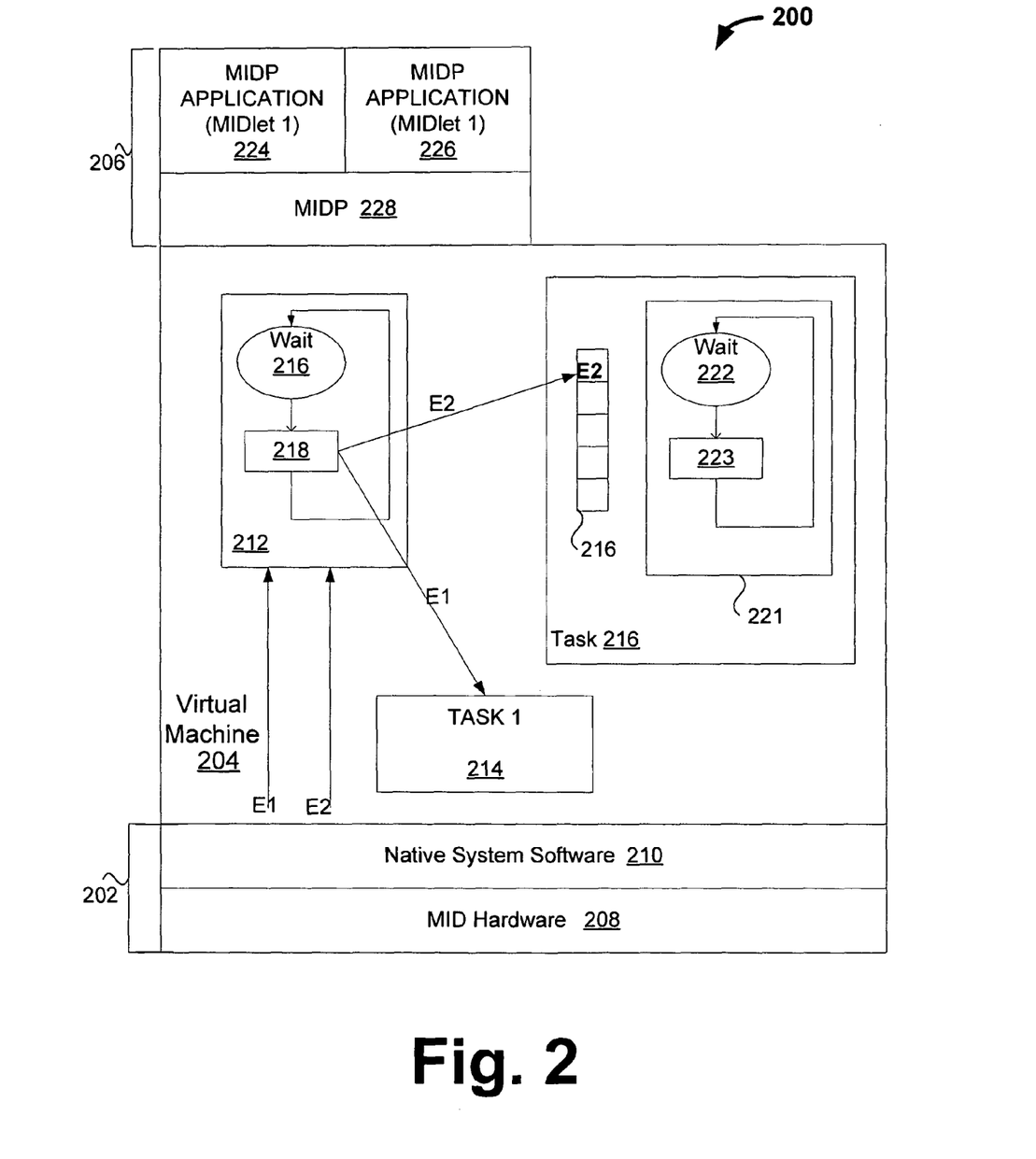
FIG. 2 illustrates a Java complaint computing environment in accordance with another embodiment of the invention.

FIG. 2 illustrates a Java complaint computing environment 200 in accordance with another embodiment of the invention. The Java complaint computing environment 200 illustrates a computing environment in accordance with Java Specification for Mobile Information Device Profile (JSR-37) which is hereby incorporated herein by reference for all purposes.

Similar to the computing environment 100 of FIG. 1, a platform layer 202, a virtual machine 204, and an application layer 206 are illustrated as architectural layers for the Java complaint computing environment 200. As shown in FIG. 2, the platform layer 202 includes a Mobile Information Device (MID) hardware layer 208, and a native system software layer 210. The Mobile Information Device (MID) hardware layer 208 represents hardware for a mobile computing device (e.g., phone, personal digital assistant). The native system software layer 210 operates on top of the Mobile Information Device (MID) hardware layer 208 and can, for example, include an operating system and/or libraries that are used to use the device. However, it should be noted that it is not necessary for the native system software layer 210 to have an operating system. Accordingly, the virtual machine 204 does not assume that the native system software layer 210 includes an operating system. In effect, the virtual machine 204 can simulate an operating system with respect to event dispatching operations.

As such, a smart event-dispatcher (or manager) 212 can dispatch a platform-specific native event E1 to a task 214 while another event E2 is dispatched to another task 214. Again, it should be noted that tasks 214 and 216 are concurrently supported by the virtual machine 204. In this embodiment, the smart event-dispatcher (or manager) 212 is implemented as an event-manager thread the waits on native events and dispatches them to various tasks. As shown in FIG. 2, the smart event-dispatcher (or manager) 212 includes wait-on-event 216 and event-dispatching logic 218. In effect, the wait-on-event 216 causes the smart event dispatcher (or manager) 212 to wait until a native event is received. When, for example, a native event E2 is received, the event-dispatching logic 218 is activated. The event-dispatching logic 218 determines which task should receive the native event E2. As noted above, this determination can be made based a variety of different criteria. In any case, the smart event-dispatcher (or manager) 212 delivers the native event E2 to at least one of a plurality of tasks (tasks 214 and 217) based on the event-dispatching logic 218.

As illustrated in FIG. 2, the smart event dispatcher (or manager) 212 delivers the native event E2 to the task 217. More particularly, the smart event-dispatcher (or manager) 212 places the native event E2 in an event-repository (e.g., First-in First-out queue) 220. The smart event-dispatcher (or manager) 212 also notifies an event-handler 221 associated with task 217 that a native event has been delivered. This causes the event-handler 221 (e.g., an event handler thread) associated with task 217 to be invoked. In effect, the notification of the delivery causes a wait-on-event logic 222 to be invoked. As a result, an event-processing logic 223 can access the event-repository 220 and process event E2 on behalf of the task 217. It should be noted that the smart event-dispatcher (or manager) 212 can manipulate data (e.g., encapsulate it) before placing it in the event-repository 220. This operation is further illustrated below (see, for example, operation 330 of FIG. 3).

It should be noted that task 214 and 217 can, for example, be associated with Mobile Information Device Profile (MIDP) applications 224 and 226 (or midlets) that are complaint with Java Mobile Information Device Profile 228. The Mobile Information Device Profile 228 is described in Java Specification for Mobile Information Device Profile (JSR-37) which has been incorporated by references for all purposes.

It should also be noted that the techniques for events dispatching illustrated in FIG. 2 can also be implemented in computing environments that are not complaint with Java Specification for Mobile Information Device Profile (JSR-37). This should be evident because, among other things, the event manager, event handler, and event queue can be implemented in any virtual machine to dispatch events in a similar manner as discussed above. As such, these techniques can be used to dispatch events in any virtual machine.

As noted above, native events can be dispatched, for example, to a task that is in the foreground in accordance with one embodiment of the invention. Such a task is typically processed in the foreground. In a mobile device, typically the foreground desk is the only task (or representation of a task) displayed for the user. By way of example, a calculator task can be the task in the foreground while another task (e.g., music player) is running in the background. In a mobile device, if the calculator task is the foreground task, it will typically be the only task displayed on a display for the user. A graphical representation (e.g., an icon, window) of the foreground task is typically displayed for the user. The user can interact with the task (e.g., calculator) via the graphical representation and/or another device (e.g., keyboard). This interaction can generate native events that are, in turn, provided to the foreground task for processing.

Figure 3:
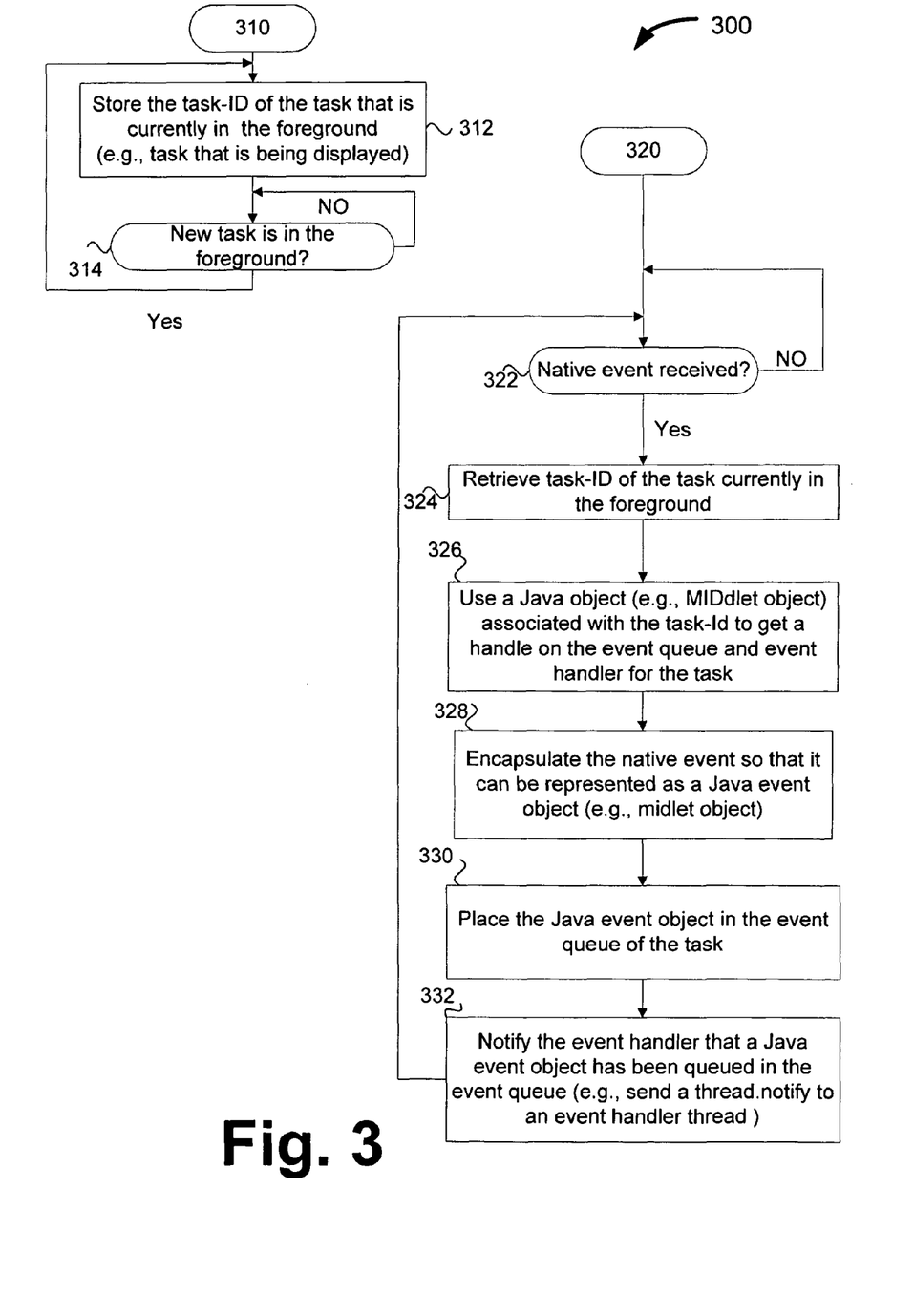
FIG. 3 illustrates a method for dispatching native events to a foreground task in accordance with one embodiment of the invention.

To further illustrate, FIG. 3 illustrates a method 300 for dispatching native events to a foreground task in accordance with one embodiment of the invention. The foreground task can, for example, be the task that is displayed on a display device for a user. In mobile devices, the task that is in the foreground is typically the only task (or representation of a task) that is displayed for the user at a given time. However, the user can place a different task in the foreground. The method 300 can, for example, be used by the virtual machine 204 of FIG. 2 to dispatch events to foreground tasks.

In any case, the processing 310, starts at operation 312 where a task-ID (or task identification) of the task that is currently in the foreground (foreground task) is stored. Next, at operation 312, a determination is made as to whether a new task is in the foreground. The processing 312 waits until it is determined at operation 312 that a new task is in the foreground. If it is determined at operation 312 that a new task is in the foreground, the processing 310 proceeds to operation 312 where a task-ID (or task identification) of the task currently in the foreground (foreground task) is stored.

The processing 320, however, starts at operation 322 where a determination is made as to whether a native event has been received. The processing 320 waits until operation 322 determines that a native event has been received. If it is determined at operation 322 that a native event has been received, the processing 320 proceeds to operation 324 where the task-ID of the foreground task is retrieved. Thereafter, at operation 326, a Java object (e.g., MIDlet object) associated with the task identified by the task-ID is obtained. This Java object is then used to get handles (e.g., reference) on the event-repository and an event-handler for the foreground task. After the handles for the event-repository and an event-handler are obtained, the native event is encapsulated at operation 328 so that it can be represented as a Java event object (e.g., MIDlet event object). Accordingly, at operation 330, the Java event object is placed in the event-repository using the handle of the event-repository of the foreground task. Finally, at operation 332, the event-handler can be notified using its handle. This can, for example, be achieved by sending a "thread.notify" to an event handler thread. In any case, the notification alerts the event-handler that a Java event object has been queued in the event-repository. The processing 320 then proceeds to operation 320 when it is determined whether a native event has been received.

As will be appreciated by those skilled in the art, some tasks implemented in Java may not be able to access data in data structures that are not implemented in Java (i.e., a native programming language). One such example is Java tasks that do not share data with each other or tasks that are in other ways isolated from each other. These tasks can be referred to as "isolates." Isolates and possibly other Java tasks may not be able to directly access event repository and handlers that are represented as data structures that are implemented in Java.

The Java virtual machine itself, however, may be implemented in a programming language other than Java (e.g., C, C++). Moreover, the code for the Java virtual machine itself can be used to access data structures that are implemented in a native programming language. Thus, the virtual machine itself can manipulate data to represent it as Java data structures. These Java data structures can then be accessed by the isolates and other Java tasks. This data manipulation can be done by the virtual machine itself. Hence, no Java code needs to be executed to manipulate data to be Java compliant.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of processing platform-specific events by a virtual machine that operates on a first platform, wherein said virtual machine concurrently supports a first task and a second task, said method comprising:

simultaneously receiving, by the virtual machine, a plurality of platform-specific events which are associated with the first platform, wherein each said platform-specific event is an external event initiated externally to said virtual machine;
concurrently selecting, for each said platform-specific event, a selected task that defines which of said first and second tasks should process said platform-specific events;
simultaneously manipulating each said platform-specific event received by modifying a data structure of each said platform-specific event to comply with a data structure format supported by said selected task, thereby representing each said platform-specific event in a form that is accessible by said selected task;
assigning a platform-specific event-repository to said selected task, wherein said platform-specific repository provides event storage prior to processing by said selected task:
providing a platform-specific event-handler for said selected task;
using a platform-specific event-dispatcher, placing said platform-specific event in said platform-specific event-repository and invoking said platform-specific event-handler to initiate processing of said platform-specific event said selected task; and
processing each said platform-specific event by said selected task.

2. The method as recited in claim 1, wherein said event-repository is implemented as a first-in first-out queue, wherein said event-handler is implemented as an event-handler thread, and wherein said selection is performed by an event-manager thread of said virtual machine.

3. The method as recited in claim 1, wherein said platform-specific event is manipulated to be associated with a Java compliant data structure.

4. The method as recited in claim 3, wherein said manipulating of said platform-specific event is performed by said virtual machine.

5. The method as recited in claim 1, wherein said selected task is associated with a Java compliant Mobile Information Device Profile application (MIDlet).

6. The method as recited in claim 1, wherein said determination comprises: selecting a foreground task when said determination is made.

7. The method as recited in claim 1, wherein said selected task is associated with a Java compliant Mobile Information Device Profile application (MIDlet), and wherein said determination comprises:
selecting a foreground task when said determination is made, said foreground task processed in the foreground relative to an unselected task and displayed in the foreground relative to the unselected task.

8. The method as recited in claim 7, wherein said determination of said, foreground tasks comprises: selecting a task that is displayed for a user.

9. The method as recited in claim 8, wherein said first platform includes a mobile device.

10. A system implementing a virtual machine for processing platform-specific events associated with a first platform, wherein said system concurrently supports first and second tasks, said system comprising:
one or more processors;
first and second tasks concurrently operating on said virtual machine; and
a platform-specific event dispatcher that operates to:
simultaneously receive a plurality of platform-specific events associated with said first platform, wherein each said platform-specific event is an external event initiated externally to said virtual machine;
concurrently select, for each said platform-specific event, a selected task that defines which of said first and second tasks should receive said platform specific events, wherein said virtual machine simultaneously modifies a data structure of said platform-specific event to be compliant with a data structure format supported by said selected task, thereby representing platform-specific events in a form that is accessible by said selected task;
a platform-specific event-repository for said selected task, wherein said platform-specific repository provides event storage prior to processing by said selected task; and
a platform-specific event-handler for said selected task, wherein said platform-specific event-dispatcher operates to place said platform-specific event in said platform-specific event-repository and invoke said platform-specific event-handler to initiate processing of said platform-specific event.

11. The system as recited in claim 10, wherein said platform-specific event-handler is invoked when said selected task is selected, and wherein said platform-specific event-handler processes said platform-specific event when said platform-specific event-handler is invoked.

12. A computer readable storage medium including a computer program for processing platform-specific events by a virtual machine that operates on a first platform, wherein said virtual machine concurrently supports first and second tasks, said computer readable medium comprising:
computer program code for simultaneously receiving a plurality of platform-specific events which are associated with the first platform, wherein each said platform-specific event is an external event initiated externally to said virtual machine;
computer program code which concurrently selects, for each said platform-specific event, a selected task that defines which of said first and second tasks should receive said platform-specific events;
computer program code that manipulates each said platform-specific event received by modifying its data structure to be compliant with a data structure format supported by said selected task, thereby representing each said platform-specific events in a form that is accessible by said selected task;
computer program code that assigns a platform-specific event-handler and a platform-specific event-repository to said selected task, wherein said platform-specific repository provides event storage prior to processing by said selected task;
computer program code that places said platform-specific events in said platform-specific event-repository and invokes said platform-specific event-handler to initiate processing of said platform-specific event; and
computer program code for processing each of said platform-specific events by the respective selected task.

13. The computer readable storage medium as recited in claim 12, wherein said selected task is associated with a Java compliant Mobile Information Device application (MIDlet).

* * * * *